United States Patent

Chang

[11] Patent Number: 6,116,806
[45] Date of Patent: Sep. 12, 2000

[54] CONNECTION TIGHTNESS AND SWING ANGLE ADJUSTABLE PIVOT

[76] Inventor: Chin Pao Chang, No. 522, Sec.1, Wan Shou Road, Kuei Shan Hsiang, Taoyuan Hsien, Taiwan

[21] Appl. No.: 09/250,809

[22] Filed: Feb. 17, 1999

[51] Int. Cl.[7] .................................................. F16C 11/06
[52] U.S. Cl. ............................. 403/145; 403/84; 403/8; 16/342; 16/376; 411/55; 411/60.2
[58] Field of Search .................................... 403/113, 119, 403/145, 147, 7, 8, 371, 84; 411/55, 60.2; 16/342, 376

[56] References Cited

U.S. PATENT DOCUMENTS

| | | | |
|---|---|---|---|
| 587,938 | 8/1897 | Dawes | 403/8 |
| 674,528 | 5/1901 | Watson et al. | 403/8 |
| 1,569,619 | 1/1926 | Cranzler | 16/376 |
| 5,503,491 | 4/1996 | Lu | 403/86 |
| 5,774,939 | 7/1998 | Lu | 16/342 |

*Primary Examiner*—Lynne Browne
*Assistant Examiner*—Kenneth Thompson
*Attorney, Agent, or Firm*—Dougherty & Troxell

[57] ABSTRACT

A connection tightness and swing angle adjustable pivot includes a rotary shaft, a stationary shaft having a slit end rotatably received in an end of the rotary shaft, and an adjusting bolt. The adjusting bolt is screwed into the slit end of the stationary shaft with a head portion located in the rotary shaft but accessible with a hand tool via openings formed on the rotary shaft. The adjusting bolt has a tapered portion contacting with another tapered surface around inner wall of the stationary shaft. When the adjusting bolt is turned at the head portion via the openings on the rotary shaft so that it is screwed further into the stationary shaft, its tapered surface tightly presses against the tapered surface in the stationary shaft to expand the slit end of the stationary shaft, so that the stationary shaft more tightly contacts with inner wall of the rotary shaft. Moreover, the rotary shaft is provided at the end receiving the stationary shaft with a curved stopper that limits the rotary shaft to rotate relative to the stationary shaft within an angle defined by a radian of the curved stopper.

2 Claims, 3 Drawing Sheets

CONNECTION TIGHTNESS AND SWING ANGLE ADJUSTABLE PIVOT

FIELD OF THE INVENTION

The present invention relates to an in-line pivot that occupies a minimized space, and more particularly to a connection tightness and swing angle adjustable in-line pivot in which a rotary shaft is rotatably connected to a stationary shaft and an angle at which the rotary shaft could be swung relative to the stationary shaft can be always controlled and maintained by easily turning an adjusting bolt between the two shafts.

BACKGROUND OF THE INVENTION

There are many different pivot structures available for use. FIG. 1 illustrates a conventional pivot that has a generally N-shaped configuration formed from a rotary shaft 6, a stationary seat 7, and a fixing means 70. The rotary shaft 6 has a first end 61 in a form of round bar and a second end 62 in a form of flat bar having several mounting holes provided thereon for connecting the rotary shaft 6 to a rotary part of an article, such as a screen of a notebook computer. The stationary seat 7 is an L-shaped member having a short arm and a long arm. The rotary shaft 6 is rotatably connected to the stationary seat 7 by extending its round second end 62 through a hole on the short arm of the stationary seat 7 and putting a pivotal fixing means 8 around the second end 62. The fixing means 70 is fixedly connected to the long arm of the stationary seat 7 by extending an end into a hole formed on the long arm and then fixed at the other end to a stationary part of the article, such as a keyboard of the notebook computer. When the connection between the rotary shaft 6 and the stationary seat 7 of the pivot becomes loose, it may be adjusted to resume a suitable tightness by tightening the pivotal fixing means 8 against the short arm. A shortcoming of the pivot of FIG. 1 is its N-shaped body has a big volume and occupies too much space. When the pivot of FIG. 1 is used on a notebook computer, there would be a considerably big clearance between the rotary part (the screen) and the stationary part (the keyboard).

An in-line pivot having reduced volume and occupying less space as shown in FIG. 2 is therefore developed to replace the N-shaped pivot of FIG. 1. This in-line pivot includes a rotary shaft 4 and a stationary shaft 5. The rotary shaft 4 has a first end 41 in a form of hollow cylinder having two diametrically opposite cuts 411, and a second end 42 in a form of semi-circular solid bar. The stationary shaft 5 has a first end that can be axially and suitably tightly fitted in the first end 41 of the rotary shaft 4, such that the rotary shaft 4 may rotate relative to the stationary shaft 5, allowing a rotary part, such as the screen of a notebook computer, connected to the rotary shaft 4 to be swung and located at any desired inclined angle relative to a stationary part, such as the keyboard of the notebook computer. A second end 52 of the stationary shaft 5 is in a form of round solid bar. While this in-line pivot shown in FIG. 2 eliminates the drawbacks of the N-shaped pivot of FIG. 1, it has a disadvantage that the first ends 41 and 51 of the rotary and the stationary shafts 4 and 5, respectively, would become loosely connected to each other after the pivot has been used for a long time and the first ends 41, 51 are worn at their contact surfaces. The rotary part, such as the screen of a notebook computer, connected to the rotary shaft 4 would therefore automatically turn to cover the stationary part (i.e., the keyboard of the notebook computer) when a rotary angle is less than 90 degrees, or turn further to a straight angle relative to the stationary part when the rotary angle exceeds 90 degrees, instead of locating at a visual angle suitable for working.

Another disadvantage existing in both of the above two conventional pivots is when they are used on the notebook computer, the screen can not be conveniently turned relative to the keyboard within a limited angular range to provide an optimal visual angle even if the rotary shaft and the stationary shaft of the pivot are connected to each other in a suitably adjusted tightness.

SUMMARY OF THE INVENTION

It is therefore a primary object of the present invention to provide a connection tightness adjustable pivot formed from a rotary shaft, a stationary shaft having a slit end rotatably received in an end of the rotary shaft, and an adjusting bolt. The adjusting bolt is screwed into the slit end of the stationary shaft with a head portion located in the rotary shaft but accessible with a hand tool via openings formed on the rotary shaft. The adjusting bolt has a tapered portion contacting with another tapered surface around inner wall of the stationary shaft. When the adjusting bolt is turned at the head portion via the openings on the rotary shaft so that it is screwed further into the stationary shaft, its tapered surface tightly presses against the tapered surface in the stationary shaft to expand the slit end of the stationary shaft, so that the stationary shaft more tightly contacts with inner wall of the rotary shaft.

Another object of the present invention is to provide a swing angle adjustable pivot including a rotary shaft and a stationary shaft connected to an end of the rotary shaft. The rotary shaft is provided at the end receiving the stationary shaft with a curved stopper that cooperates with a notch provided on the stationary shaft to limit the rotary shaft to rotate relative to the stationary shaft within an angle defined by a radian of the curved stopper.

BRIEF DESCRIPTION OF THE DRAWINGS

The structural features of the present invention can be best understood by referring to the following detailed description of the preferred embodiments and the accompanying drawings, wherein.

DETAILED DESCRIPTION OF THE PREFERRED EMBODIMENTS

Figure 2:
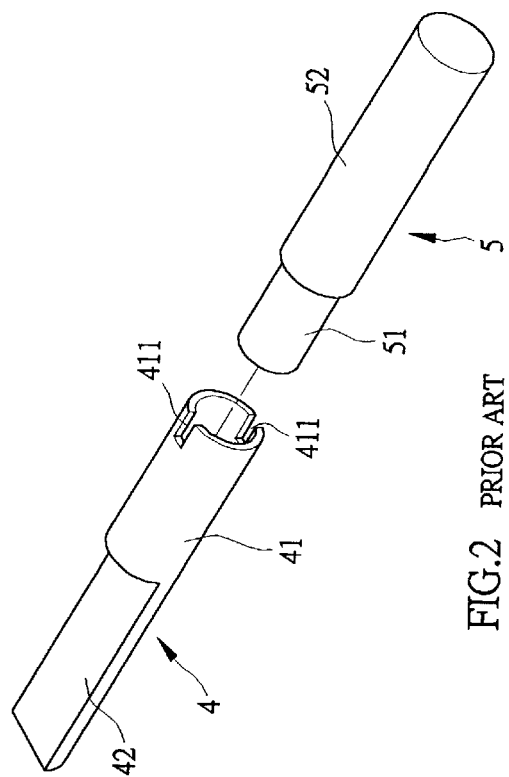
FIG. 2 is a perspective of a second conventional pivot.
Figure 1:
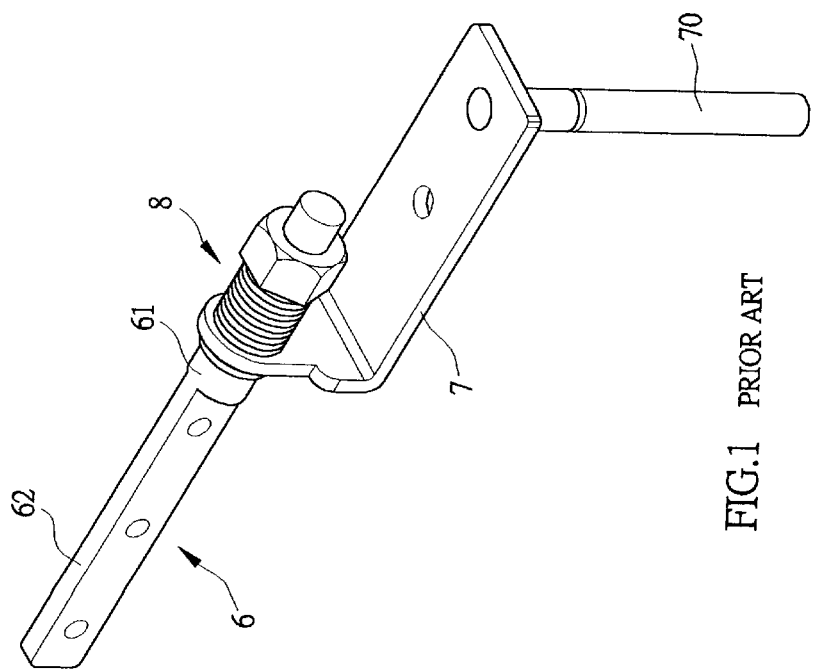
FIG. 1 is a perspective of a first conventional pivot.
Figure 3:
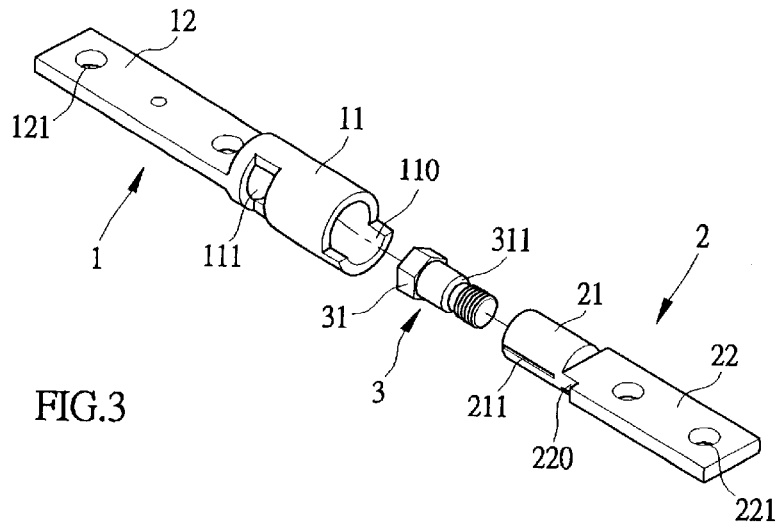
FIG. 3 is an exploded perspective of a pivot according to the present invention.

Please refer to FIG. 3 that is an exploded perspective of a pivot according to the present invention. As shown, the pivot includes a rotary shaft 1, a stationary shaft 2, and an adjusting bolt 3.

The rotary shaft 1 of the pivot has a first end portion 11 in a form of hollow cylinder and a second end portion 12 in a form of flat bar. A part of an outer end of the first end portion 11 axially extends outward to form a curved stopper 110 that defines a predetermined radian. The first end portion 11 is provided near an inner end thereof with two diametrically opposite openings 111 through which a hand tool, such as a pointed hand vice (not shown), may be extended into. There is more than one through hole 121 provided on the second end portion 12.

Figure 5:
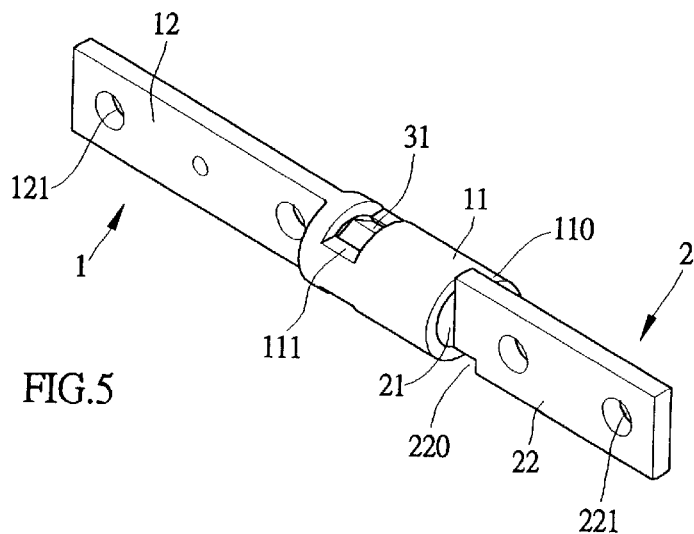
FIG. 5 is an assembled perspective of the pivot of FIG. 3 viewed from another angle.
Figure 6:
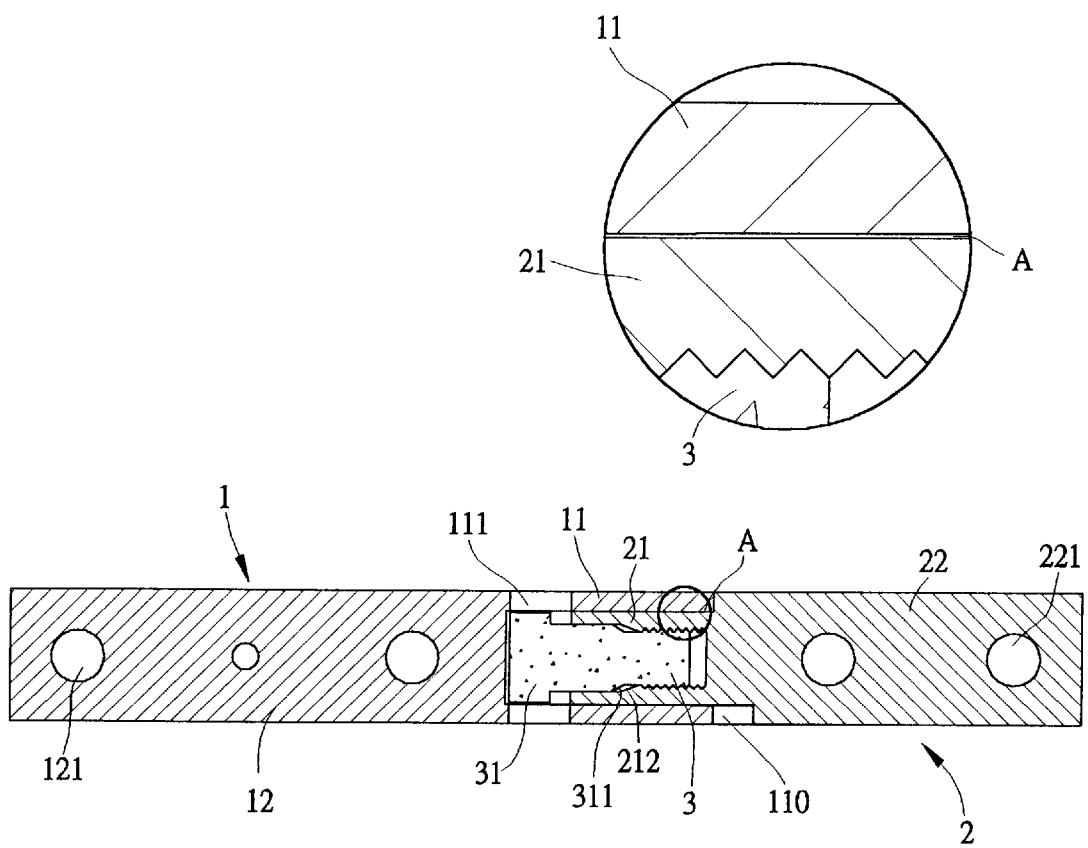
FIG. 6 is a sectional view of the pivot shown in FIG. 4, wherein the rotary shaft of the pivot is not tightly engaged with the stationary shaft.

The stationary shaft 2 of the pivot also has a first end portion 21 in a form of hollow cylinder and a second portion 22 in a form of flat bar. The first end portion 21 may be fitly received in the first end portion 11 of the rotary shaft 1 with an outer end of the first end portion 21 flushing with the outer end of the first end portion 11, as can be seen from FIGS. 3, 4, and 5. The first end portion 21 of the stationary shaft 2 is provided with two diametrically opposite slits 211 axially extended from the outer end to a predetermined length. Please go to FIGS. 6 and 7. An inner end of the first end portion 21 is provided with an internal thread, and a portion of an inner wall surface of the first end portion 21 between the end of the slits 211 and the internal thread is axially inward tapered to form a tapered surface 212. The second end portion 22 of the stationary shaft 2 has a width equal to an outer diameter of the first end portion 11 of the rotary shaft 1. Again, more than one through hole 221 is provided on the flat second end portion 22. What is to be noted is a corner at an inner end of the second end portion 22 adjacent to the first end portion 21 is cut away to form a notch 220, so that the notch 220 has a radial depth equal to a wall thickness of the first end portion 11 of the rotary shaft 1 and an axial length equal to that of the stopper 110. Whereby, when the first end portion 21 of the stationary shaft 2 is received in the first end portion 11 of the rotary shaft 1, the rotary shaft 1 can be rotated relative to the stationary shaft 2 in two directions within a limited swing angle defined by the radian of the stopper 110.

Figure 4:
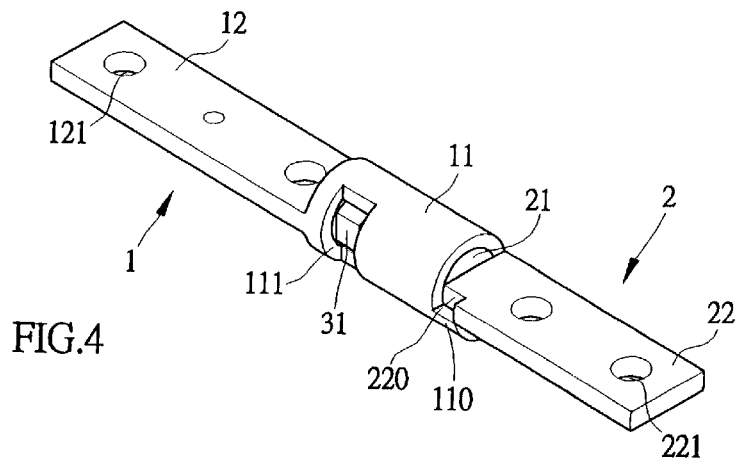
FIG. 4 is an assembled perspective of the pivot of FIG. 3.

Please refer to FIG. 4. When the stationary shaft 2 is connected to the rotary shaft 1, the inner end of the flat second end portion 22 abuts against the outer end of the first end portion 11 and locates to one side of the stopper 110 that projects from the outer end of the first end portion 11. When the rotary shaft 1 is rotated clockwise (when viewing in front of the drawing), the stopper 110 originally located below the stationary shaft 2 is allowed to pass through the notch 220 to locate above the stationary shaft 2. And, when the stopper 110 is moved to contact with the other side of the inner end of the flat second end portion 22 of the stationary shaft 2, the rotary shaft 1 is stopped from rotating any further.

Please now refer back to FIG. 3. The adjusting bolt 3 has a threaded end that is screwed into the first end portion 21 of the stationary shaft 2 to engage with the internal thread of the first end portion 21, and a head portion 31 that is located in the first end portion 11 of the rotary shaft 1 and can be accessed from the openings 111 after the stationary shaft 2 is connected to the rotary shaft 1. A small portion of the adjusting bolt 3 adjacent to the threaded end is gradually reduced in diameter to form a tapered surface 311 corresponding to the tapered surface 212 inside the first end portion 21 of the stationary shaft 2.

Figure 7:
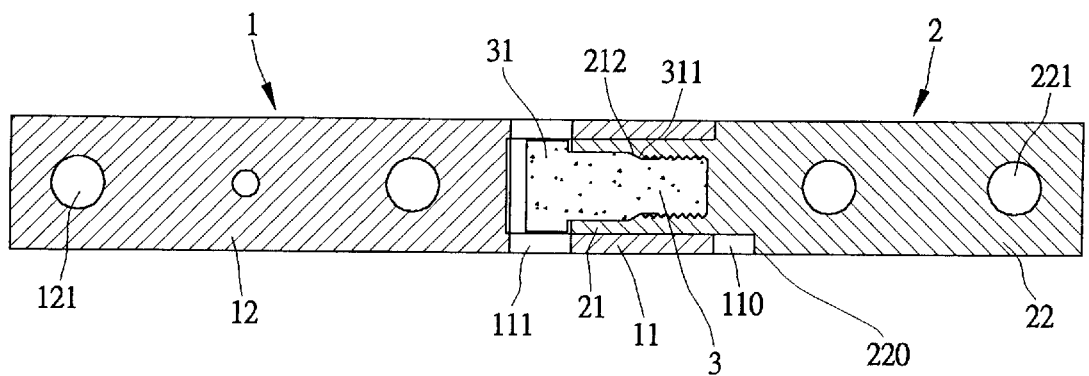
FIG. 7 is a sectional view of the pivot shown in FIG. 5, wherein the rotary shaft of the pivot has been adjusted to tightly engage with the stationary shaft.

Please refer to FIG. 6 again. When the stationary shaft 2 is not fully tightly connected to the rotary shaft 1, there would be a clearance A existing between the two coupled first end portions 21 and 11. At this point, the adjusting bolt 3 may be turned with a pointed hand vise (not shown) clamping at the head portion 31 via the openings 111, so that the adjusting bolt 3 is screwed further into the internal thread of the first end portion 21. Meanwhile, the adjusting bolt 3 would press its tapered surface 311 against the tapered surface 212 behind the slits 111 on the first end portion 21 and thereby expand the first end portion 21, causing the same to tightly contact with the first end portion 11 and eliminate the clearance A, as shown in FIG. 7. In brief, by turning the adjusting bolt 3 via the openings 111, the tightness of the pivotal connection of the rotary shaft 1 to the stationary shaft 2 can be adjusted.

Thus, whenever the pivot of the present invention is found to have loosely connected shafts 1 and 2, a user may easily correct the loose pivot by turning the adjusting bolt 3 with a pointed hand vise via the openings 111.

The second end portion 12 of the rotary shaft 1 may be fixedly connected to a rotary part, such as a screen of a notebook computer (not shown), by screwing fastening means, such as screws, into predetermined points on the rotary part via the through holes 121. Similarly, the second end portion 22 of the stationary shaft 2 may be fixedly connected to a stationary part, such as a keyboard of the notebook computer (not shown), by screwing fastening means, such as screws, into predetermined points on the stationary part via the through holes 221.

Since the rotary and the stationary shafts 1, 2 of the pivot of the present invention may be pivotally connected to each other in suitable tightness through the adjusting bolt 3, they can be manufactured to have different sizes corresponding to the rotary and the stationary parts onto which they are to be mounted. Whereby, the pivot of the present invention may be used not only on a notebook computer, but also on, for example, a small-sized electronic dictionary or a big-sized door.

Following are the major advantages of the pivot of the present invention:
1. The pivot is an in-line assembly that has minimized volume and occupies very small space.
2. The pivot may be easily adjusted to always maintain suitable tightness between its pivotally connected rotary and stationary shafts, enabling the rotary part on which the pivot is mounted to be turned and located at an optimal visual angle.
3. The pivot may be used on any type of object that is to be swung and then located in place.

What is to be noted is the present invention described above is to be taken as a preferred embodiment of the invention and that various changes in the arrangements may be resorted to without departing from the spirit of the invention or the scope of the subjoined claims.

What is claimed is:

1. A connection tightness and swing angle adjustable in-line pivot comprising a rotary shaft, a stationary shaft, and an adjusting bolt;

said rotary shaft having a first end portion that is in a form of hollow cylinder and a second end portion that is in a form of flat bar, said first end portion being provided at an outer end with an axially extended stopper that defines a predetermined radian, and near an inner end with two diametrically opposite openings, and said second end portion being provided with more than one through hole;

said stationary shaft also having a first end portion that is in a form of hollow cylinder and a second portion that is in a form of flat bar, said first end portion being so sized that it may be fitly received in said first end portion of said rotary shaft, said first end portion of said stationary shaft being provided with two diametrically opposite slits axially extended from an outer end of said first end portion to a predetermined length, an internal thread near an inner end of said first end portion, and an inward tapered surface around a portion of an inner wall surface of said first end portion between the ends of said slits and said internal thread; and said second end portion of said stationary shaft having a width equal to an outer diameter of said first end portion of said rotary shaft and being provided with more than one through hole, and a corner at an inner end of said second end portion of said stationary shaft adjacent to said first end portion of said rotary shaft being cut away to form a notch that has a radial depth equal to a wall thickness of said first end portion of said rotary shaft and an axial length equal to that of said stopper projected from said first end portion of said rotary shaft; whereby when said first end portion of said stationary shaft is received in said first end portion of said rotary shaft, said rotary shaft can be rotated clockwise or counterclockwise relative to said stationary shaft within a limited swing angle defined by the radian of said stopper; and said adjusting bolt having a threaded end that is screwed to engage with said internal thread of said first end portion of said stationary shaft, and a head portion that is located in said first end portion of said rotary shaft and can be turned with a hand tool via said diametrically opposite openings on said rotary shaft; a small portion of said adjusting bolt adjacent to said threaded end being gradually reduced in diameter to form a tapered surface corresponding to said tapered surface inside said first end portion of said stationary shaft, whereby when said head portion is turned to cause said adjusting bolt to be screwed further into said internal thread of said stationary shaft, said tapered surface on said adjusting bolt is pressed against said tapered surface in said stationary shaft and thereby forces said slits on said first end portion of said stationary shaft to expand, causing said stationary shaft to tightly contact with said first end portion of said rotary shaft.

2. A connection tightness and swing angle adjustable in-line pivot as claimed in claim 1, wherein said rotary and said stationary shafts of said pivot are to be fixedly mounted to rotary part and stationary part, respectively, of an article by fastening means threaded through said more than one through hole formed on said second end portions of said rotary and said stationary shafts into predetermined points on said rotary and said stationary parts of said article.

* * * * *